(12) United States Patent
Kawakatsu

(10) Patent No.: US 9,343,974 B2
(45) Date of Patent: May 17, 2016

(54) POWER SOURCE APPARATUS AND IMAGE FORMING APPARATUS

(71) Applicant: CANON KABUSHIKI KAISHA, Tokyo (JP)

(72) Inventor: Jun Kawakatsu, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 76 days.

(21) Appl. No.: 14/166,021

(22) Filed: Jan. 28, 2014

(65) Prior Publication Data

US 2014/0212163 A1 Jul. 31, 2014

(30) Foreign Application Priority Data

Jan. 31, 2013 (JP) ................................. 2013-017119

(51) Int. Cl.
| | | |
|---|---|---|
| G03G 15/00 | (2006.01) | |
| H02M 3/335 | (2006.01) | |
| G03G 15/02 | (2006.01) | |
| G03G 15/06 | (2006.01) | |
| G03G 15/20 | (2006.01) | |

(52) U.S. Cl.
CPC ....... *H02M 3/33507* (2013.01); *G03G 15/5004* (2013.01); *G03G 15/0266* (2013.01); *G03G 15/0283* (2013.01); *G03G 15/065* (2013.01); *G03G 15/2039* (2013.01)

(58) Field of Classification Search
None
See application file for complete search history.

(56) References Cited

U.S. PATENT DOCUMENTS

| | | | | |
|---|---|---|---|---|
| 4,739,461 A * | 4/1988 | Komatsu | ................. | H02M 3/28 307/138 |
| 6,687,137 B1 * | 2/2004 | Yasumura | ......... | H02M 3/33507 363/21.01 |
| 8,411,475 B1 * | 4/2013 | Backert | ............ | H02M 3/33507 363/60 |
| 8,878,460 B2 * | 11/2014 | Lu | ...................... | H05B 33/0815 315/224 |
| 2011/0150523 A1 * | 6/2011 | Kawakatsu | ............ | G03G 15/80 399/88 |
| 2013/0020867 A1 * | 1/2013 | Hughes | ............. | H02M 3/33507 307/17 |
| 2013/0287424 A1 * | 10/2013 | Tamaoki | ........................ | 399/88 |
| 2014/0254210 A1 * | 9/2014 | Hayasaki | ............... | G03G 15/80 363/21.12 |

FOREIGN PATENT DOCUMENTS

| | | |
|---|---|---|
| JP | 11-275864 A | 10/1999 |
| JP | 3323579 B2 | 9/2002 |
| JP | 4687716 B2 | 5/2011 |
| JP | 2011-130624 A | 6/2011 |
| JP | 4915407 B2 | 4/2012 |

* cited by examiner

*Primary Examiner* — David Gray
*Assistant Examiner* — Geoffrey Evans
(74) *Attorney, Agent, or Firm* — Canon USA, Inc. IP Division

(57) ABSTRACT

A power source apparatus includes a transformer configured to output a voltage, a feedback unit configured to output a feedback signal based on the voltage output from the transformer, and a driving unit configured to drive the transformer according to a setting signal for setting the output voltage and the feedback signal. Whichever of a voltage of positive polarity and a voltage of negative polarity is output, the feedback unit controls the voltage output according to a value of a difference between the output voltage and a threshold value.

14 Claims, 13 Drawing Sheets

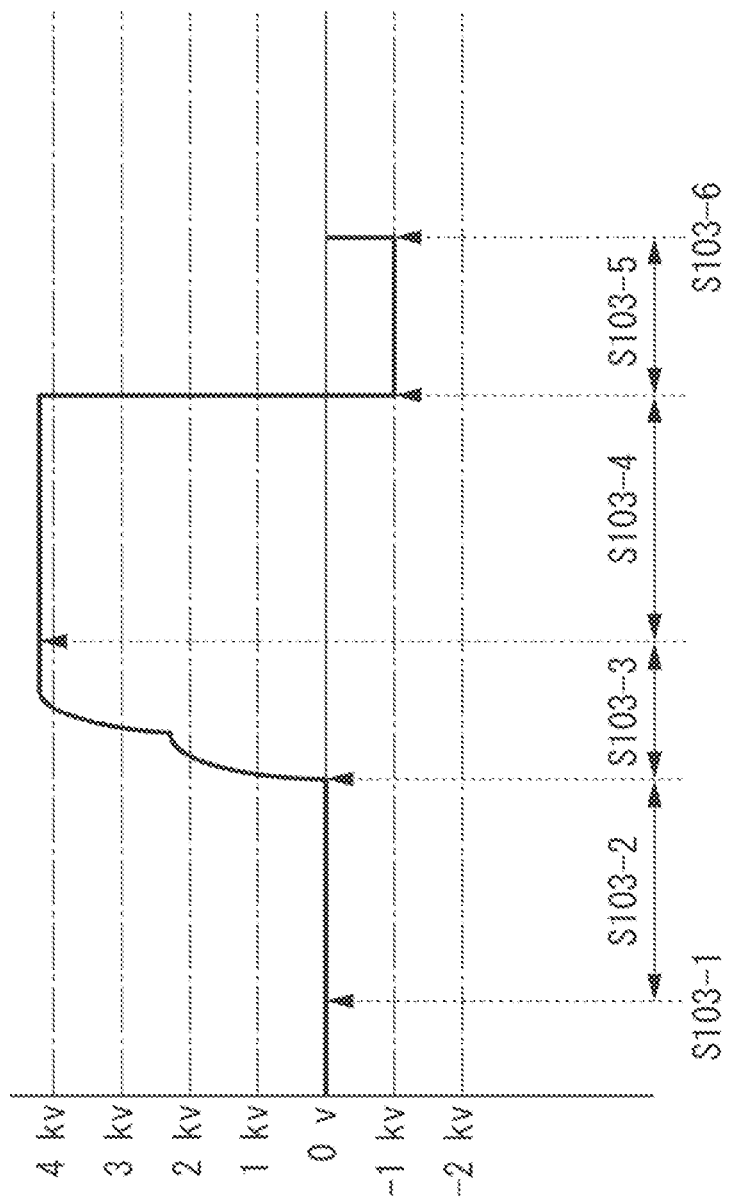

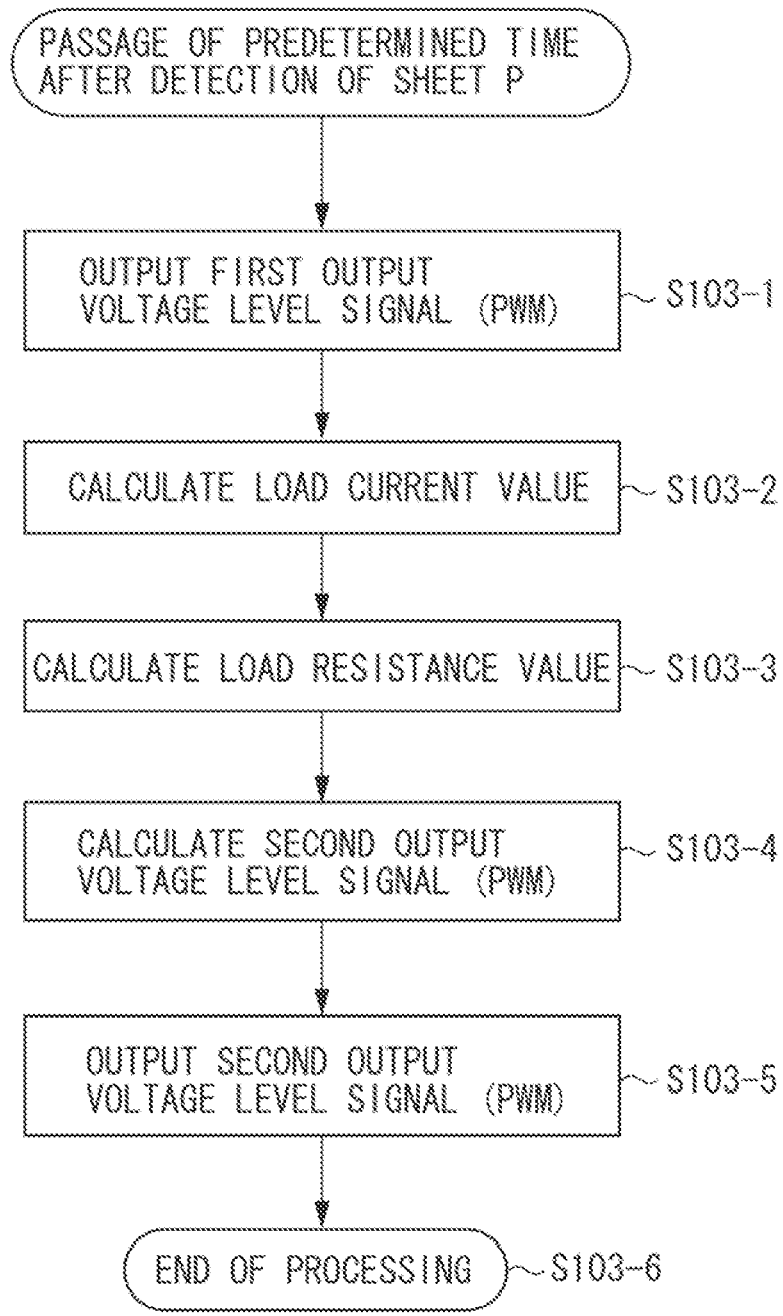

POWER SOURCE APPARATUS AND IMAGE FORMING APPARATUS

BACKGROUND OF THE INVENTION

1. Field of the Invention

The present invention relates to a power source apparatus that can output a voltage of positive polarity and a voltage of negative polarity.

2. Description of the Related Art

Conventionally, as a power source that can output both a voltage of positive polarity (hereinafter, referred to as positive voltage) and a voltage of negative polarity (hereinafter, referred to as negative voltage) from an output terminal, there has been known a power source configured by connecting power sources for respectively outputting positive and negative voltages in series. In this power source, amplifiers are individually provided to control the positive and negative voltages, respectively. The amplifiers amplify differences between target values and voltages obtained by feeding back output voltages to respectively control the positive and negative voltages (refer to the configuration discussed in Japanese Patent No. 03323579). Concerning a power source configured to include a simplified circuit of such a power source capable of outputting positive and negative voltages, Japanese Patent Application Laid-Open No. 2011-130624 discusses a configuration for outputting positive and negative voltages by a simple circuit that uses a capacitive element and two constant voltage diodes on a secondary side of a transformer.

The configuration discussed in Japanese Patent Application Laid-Open No. 2011-130624 includes a circuit configuration more simplified than that discussed in Japanese Patent No. 03323579 but not designed to feed back and adjust the respective positive and negative voltages. Consequently, there is a limitation on the control of the positive and negative voltages with higher accuracy.

SUMMARY OF THE INVENTION

The present invention is directed to a power source apparatus that can reduce a circuit size and highly accurately control positive and negative voltages in a power source capable of outputting the positive and negative voltages, and an image forming apparatus equipped with the power source.

According to an aspect of the present invention, a power source apparatus includes an output unit configured to output a voltage, a feedback unit configured to output a feedback signal based on the voltage output from the output unit, and a driving unit configured to drive the output unit according to a setting signal for setting the voltage output from the output unit and the feedback signal. Whichever of a voltage of positive polarity and a voltage of negative polarity is output from the output unit, the feedback unit controls the voltage output from the output unit according to a value of a difference between the voltage output from the output unit and a threshold value.

According to another aspect of the present invention, an image forming apparatus includes an image forming unit configured to form an image, and a power source configured to output a voltage of positive polarity and a voltage of negative polarity to the image forming unit. The power source includes an output unit configured to output a voltage, a feedback unit configured to output a feedback signal based on the voltage output from the output unit, and a driving unit configured to drive the output unit according to a setting signal for setting the voltage output from the output unit and the feedback signal. Whichever of a voltage of positive polarity and a voltage of negative polarity is output from the output unit, the feedback unit controls the voltage output from the output unit according to a value of a difference between the voltage output from the output unit and a threshold value.

Further features of the present invention will become apparent from the following description of exemplary embodiments with reference to the attached drawings.

BRIEF DESCRIPTION OF THE DRAWINGS

FIG. 12 is a chart illustrating voltage application timing of the voltage generation circuit according to the third exemplary embodiment.

FIG. 13 is a flowchart illustrating a voltage application sequence of the voltage generation circuit according to the third exemplary embodiment.

DESCRIPTION OF THE EMBODIMENTS

Specific configurations of the present invention to solve the aforementioned problems will be described based on the exemplary embodiments. The exemplary embodiments described below are only examples, not limiting a technical scope of the present invention.

Figure 3:
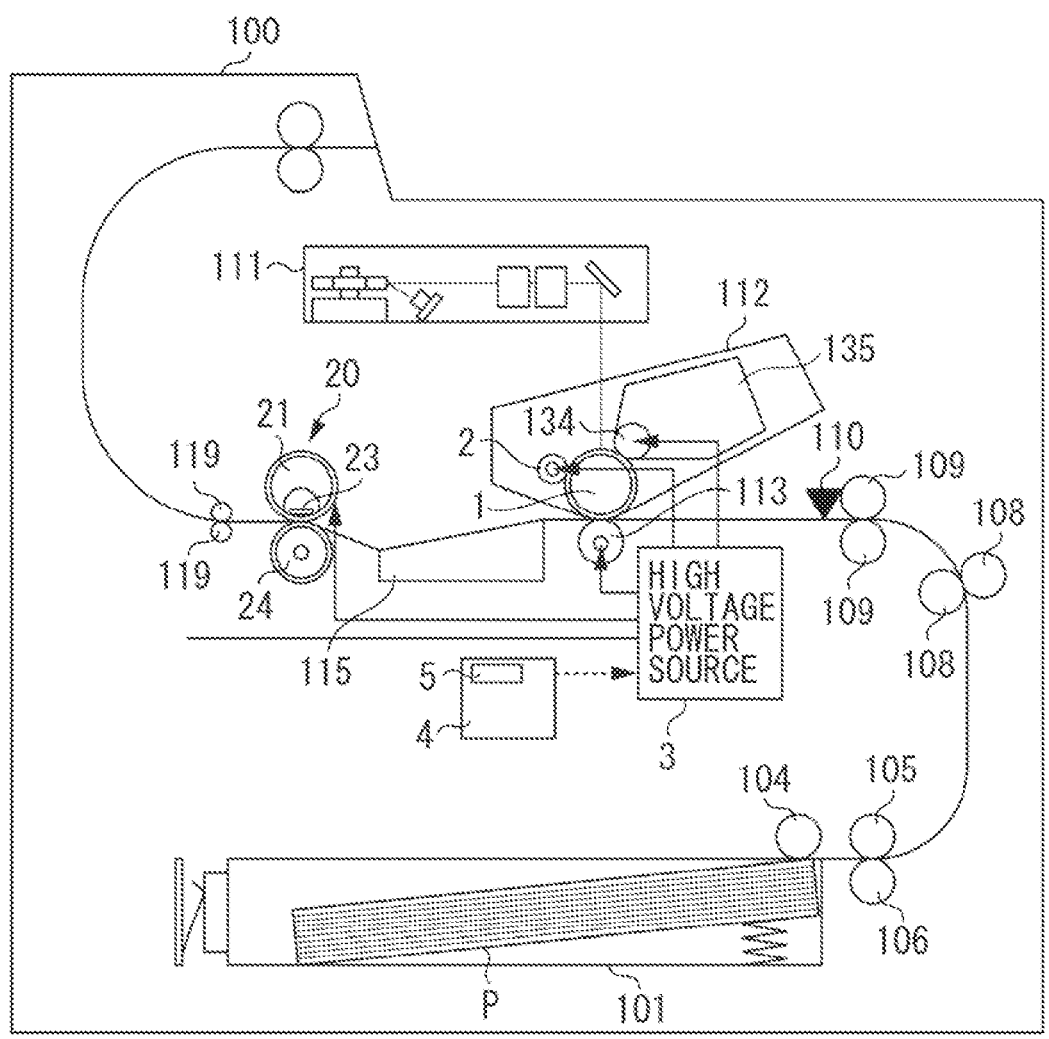
FIG. 3 is a diagram illustrating an overall configuration of an image forming apparatus.

Referring to FIG. 3, a power source apparatus according to a first exemplary embodiment and an image forming apparatus as an example of an apparatus on which the power source apparatus of the first exemplary embodiment is mounted will be described.

[Configuration of Image Forming Apparatus]

FIG. 3 is diagram illustrating a schematic configuration of the image forming apparatus and a power source according to the first exemplary embodiment. The image forming apparatus according to the present exemplary embodiment will be described by way of an example of a laser beam printer 100 that forms an image on a sheet serving as a recording medium by an electrophotographic method.

In FIG. 3, the laser beam printer 100 includes a sheet feeding deck 101 serving as a sheet stacking unit to store sheets P. A pickup roller 104 is provided to feed the sheet P from the sheet feeding deck 101. On the downstream side of the conveying direction of the sheet P from the pickup roller 104, the laser beam printer 100 includes a feeding roller 105 configured to convey the sheet P fed from the pickup roller 104, and a retard roller 106 disposed oppositely to the feeding roller 105 and configured to separate the sheet P. Further, on the downstream side of the conveying direction, a conveyance roller pair 108 is provided to convey the sheet P. On the downstream side of the conveying direction of the sheet P from the conveyance roller pair 108, the laser beam printer 100 includes a registration roller pair 109 configured to convey the sheet P in synchronization with image forming operation timing, and a sensor 110 configured to detect whether the sheet P has been fed to the registration roller pair 109. On the downstream side of the conveying direction from the registration roller pair 109, the laser beam printer 100 includes a process cartridge 112 configured to form a developer image by supplying a developer to an electrostatic latent image formed on a photosensitive drum 1 by a laser beam applied from a laser scanner unit 111.

In the present exemplary embodiment, the process cartridge 112 includes parts of an image forming unit of the image forming apparatus. Specifically, the process cartridge 112 includes the photosensitive drum 1 serving as an image bearing member on which the developer image is formed, a charging roller 2 serving as a charging member to uniformly charge a surface of the photosensitive drum 1, a developer container 135 configured to store the developer, and a developing roller 134 configured to supply the developer to the electrostatic latent image formed on the photosensitive drum 1 to visualize it as the developer image. The process cartridge 112 is configured detachable, and replaced with a new process cartridge when there is no more developer in the developer container 135.

At a position opposite the photosensitive drum 1, a transfer roller 113 is disposed to serve as a transfer member for transferring the developer image formed on the photosensitive drum 1 to the sheet P. The photosensitive drum 1 and the transfer roller 113 constitute a transfer nip portion to hold the sheet P. A conveyance guide 115 is disposed on the downstream side of the conveying direction of the sheet P from the transfer nip portion, and further on the downstream side of the conveying direction of the sheet P, a fixing apparatus 20 is disposed to fix the developer image transferred to the sheet P on the sheet P. In the present exemplary embodiment, the fixing apparatus 20 includes, for the purpose of heating and pressurizing the developer image transferred to the sheet P to fix it, a fixing film 21 serving as a heating member including a heater 23, and a pressure roller 24 serving as a pressure member disposed oppositely to the fixing film 21. The fixing film 21 and the pressure roller 24 constitute a fixing nip portion to hold the sheet P. Further, on the downstream side of the conveying direction of the sheet P from the fixing apparatus 20, a discharge roller 119 pair is disposed to convey the sheet P. The sheet P on which the developer image has been fixed is conveyed by the discharge roller pair 119 to be discharged out of the apparatus.

In the present exemplary embodiment, the laser beam printer 100 includes a power source 3 for outputting a high voltage (hereinafter, referred to as high voltage power source 3), which is configured to generate a high voltage (hereinafter, also referred to as bias) to apply it to the charging roller 2, the developing roller 134, the transfer roller 113, and the fixing film 21. The laser beam printer 100 further includes a printer control unit 4 having a CPU 5 to control an image forming operation of the laser beam printer 100. The high voltage outputting operation of the high voltage power source 3 is controlled based on a control signal from the printer control unit 4.

When the developer image is transferred to the sheet P, a leading end of the sheet P conveyed to the transfer nip portion is detected by the sensor 110. By controlling timing of forming an electrostatic latent image on the photosensitive drum 1 and causing the registration roller pair 109 to pause according to the detection timing, timing is adjusted so that the developer image on the photosensitive drum 1 can be transferred to a predetermined position of the sheet P.

Concerning a high voltage power source apparatus of the present exemplary embodiment described in detail below, an example of a high voltage power source apparatus capable of outputting biases of positive polarity and negative polarity to the fixing film 21 will be described. The high voltage power source apparatus of the present exemplary embodiment is a high voltage power source apparatus capable of performing accurate feedback control for the biases of positive and negative polarities to the same load (fixing film 21) with a simple circuit configuration. An application target of the present exemplary embodiment is only an example. An application target of the biases from the high voltage power source is not limited to the fixing film 21, but can be a load that requires both biases of positive polarity and negative polarity. Hereinafter, the bias applied to the fixing film 21 will be described as a fixing bias. As the fixing bias, the bias of negative polarity is applied while the sheet P to which an image has been transferred passes through the fixing nip portion. At timing when the sheet P is not passing through the fixing nip portion, the bias of positive polarity is applied. Application timing of the bias of positive polarity is appropriately set according to a prescription for the fixing film 21 or the pressure roller 24, or a printing speed.

[Configuration of High Voltage Power Source Apparatus]

Figure 1:
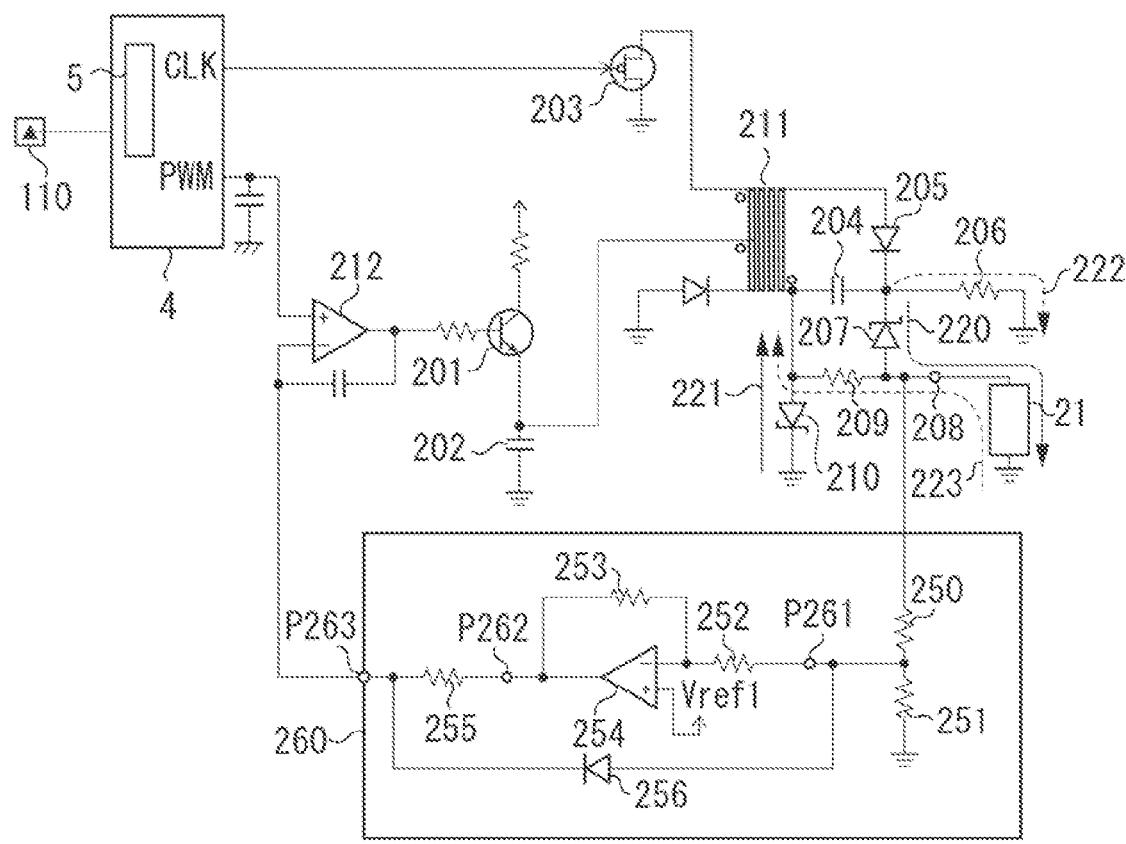
FIG. 1 is a diagram illustrating a voltage generation circuit of a power source according to a first exemplary embodiment.

Next, referring to FIGS. 1 and 2, the configuration of the high voltage power source apparatus capable of outputting both biases of positive and negative polarities to the same load according to the present exemplary embodiment will be described. FIG. 1 illustrates a voltage generation circuit of the high voltage power source 3 according to the present exemplary embodiment. Specifically, by inputting a clock signal from the CPU 5 included in the printer control unit 4 to a field-effect transistor (FET) 203, the FET 203 is switched to drive a transformer 211 serving as an output unit to output a high voltage. After the transformer 211 is driven, current flowing to a secondary side of the transformer 211 is rectified by a rectifying diode 205 to generate a voltage across a capacitor 204. The generated voltage is output as a fixing bias from a P208 (terminal 208) to the fixing film 21. The voltage across the capacitor 204 (hereinafter, referred to as Vca) can be adjusted by a transistor 201 via an error amplifier 212 by changing a PWM value according to a setting signal output from the CPU 5. Hereinafter, a flow of feedback-controlling the fixing bias by changing an output of a feedback unit 260 according to an absolute value of a difference between the output of the fixing bias and a threshold value will be described. For easier understanding, in the present exemplary embodiment, description will be made under the condition that a reference voltage Vref1 as a + input of an error amplifier 254 is 0 V and a threshold value is 0 V.

Flowing main current to the fixing film 21 when the output of the fixing bias is negative polarity and positive polarity will be described, respectively. First, when the bias of negative polarity is applied, processing is as follows. By changing the PWM value so that a voltage equal to or lower than a breakdown voltage can be applied to a constant voltage diode 210 to adjust the Vca, the main current to the fixing film 21 connected to the P208 flows, as indicated by arrows 222 and 223, in the order of a resistor 206, the load (fixing film 21), P208, and a resistor 209, thereby applying the fixing bias of negative polarity.

On the other hand, when the bias of positive polarity is applied, processing is as follows. By changing the PWM value so that breakdown current can flow to a constant voltage diode 207 to adjust the Vca, the main current to the fixing film 21 connected to the P208 flows, as indicated by arrows 220 and 221, in the order of the constant voltage diode 207, P208, the load (fixing film 21), and the constant voltage diode 210, thereby applying the fixing bias of positive polarity.

Thus, in order to change the output of the fixing bias from the negative polarity to the positive polarity by varying the PWM value according to the setting signal from the CPU 5, breakdown voltages of the two constant voltage diodes are set so that breakdown can occur in the order of the constant voltage diodes 210 and 207.

Figure 2:
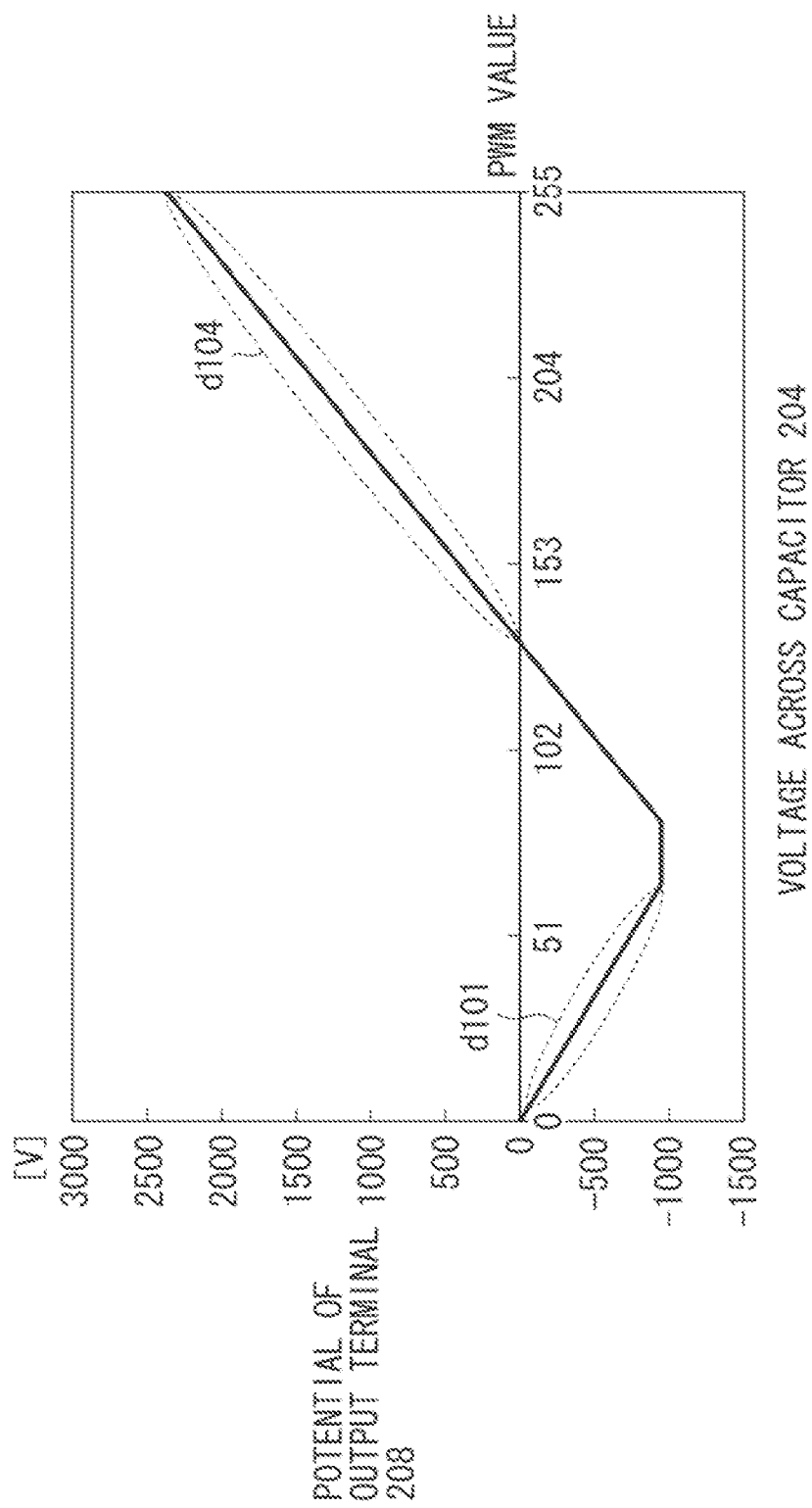
FIG. 2 is a graph illustrating a change in potential of an output terminal relative to a voltage across a capacitor according to the first exemplary embodiment.

FIG. 2 is a graph illustrating output characteristics of a fixing bias where a horizontal axis indicates a PWM value and a vertical axis indicates an output (output voltage) of the fixing bias. For the PWM value, values of 0 to 255 can be set. The PWM values illustrated in FIG. 2 indicates 51, 102, 153, 204, and 255 (equal intervals of 51). The PWM value is interlocked with the voltage across the capacitor 204 (Vca). In the present exemplary embodiment, since feedback processing is performed based on an absolute value of a difference from the threshold value 0 V, a range d101 must be used when a bias of negative polarity is output, while a range d104 must be used when a bias of positive polarity is output. In both of the ranges d101 and d104, in the characteristics illustrated in FIG. 2, the absolute value of the difference from the threshold value increases as the PWM value increases (toward right in FIG. 2: the PWM value increases in this example).

Next, the operations of the feedback unit 260 will be described individually for the case where the output of the fixing bias is in the range d101 and for the case where the output of the fixing bias is in the range d104. In the case where the output of the fixing bias is in the range d101, a potential at a point P261 decreases as the output decreases (toward right in FIG. 2: the PWM value increases in the example). However, since the error amplifier 254 operates to set a potential at a minus input terminal equal to that of a plus input terminal, an output of the error amplifier 254 increases as the output of the fixing bias decreases. The output of the error amplifier 254 is an output of a feedback signal from the feedback unit 260 to determine a potential of the P263. In other words, in the case where the output of the fixing bias is in the range d101, when the output decreases (absolute value of difference from threshold value 0 V increases), an output value of the feedback signal from the feedback unit 260 increases, and, by an operation of the error amplifier 212 serving as a comparison unit, control is performed to reduce an input value to the primary side of the transformer and accordingly an output of the secondary side of the transformer, thereby stably operating the circuit.

In the case where the output of the fixing bias is in the range d104, the potential of the P261 increases as the output increases. However, since the error amplifier 254 operates to maintain the potential at the minus input terminal equal to that of the plus input terminal, an output of the error amplifier 254 decreases as the output of the fixing bias increases. The output of the error amplifier 254 is not equal to or less than the threshold value 0 V, and accordingly, roughly 0 V is set at the point P262. This means that potentials of two input pins of the error amplifier 254 are different. A value obtained by dividing the potential of the point P261 by parallel resistors of 250, 251, 252, 253, and 255 is set as an output value of the feedback signal from the feedback unit 260 to determine a potential at the point P263. In other words, in the case where the output of the fixing bias is in the range d104, when the output increases (absolute value of difference from threshold value 0 V increases), an output value of the feedback signal from the feedback unit 260 increases, and, by the operation of the error amplifier 212 serving as a comparison unit, control is performed to reduce an input to the transformer and accordingly an output of the transformer, thereby stably operating the circuit.

As described above, in both of the case where the output of the fixing bias is negative polarity and the case where it is positive polarity, in order to perform feedback control according to the size of the absolute value of the difference from the threshold value 0 V, constants (resistance values) of the resistors 250, 251, 252, 253, and 255 are selected to satisfy the following conditions (1) and (2).

When a positive bias is output:

$$V(P261) - Vf(D256) > V(P262) \qquad (1)$$

When a negative bias is output:

$$V(P261) < V(P262) \qquad (2)$$

V (P261): voltage of the point P261
V (P262): voltage of the point P262
Vf (D256): forward direction voltage of a diode 256

After selection of the constant of each resistor, an output voltage V (P263) that is an output value of a feedback signal from the feedback unit 260 can be calculated by the following expressions (3) and (4).

In the case of a positive bias output:

$$V(P263) = V(P208) \cdot \frac{R251 \,//\, R255 \,//\, (R252 + R253)}{R250 + \{R251 \,//\, R255 \,//\, (R252 + R253)\}} \qquad (3)$$

In the case of a negative bias output:

$$V(P263) = \frac{V(P208) \cdot R251 \cdot R252 + Vref1 \cdot R250 \cdot R251}{R250 \cdot R251 + R251 \cdot R252 + R252 \cdot R255} \qquad (4)$$

V (P263): voltage of the point P263
V (P208): voltage of the point P208
//: parallel resistance As described above, in the present exemplary embodiment, when the bias of negative polarity is output, the output value of the feedback signal from the feedback unit 260 increases as the output decreases. When the bias of positive polarity is output, the output value of the feedback signal from the feedback unit 260 increases as the output increases. Thus, in both cases, feedback control can be performed according to the size of the absolute value of the difference between the output and the threshold value.

Thus, according to the present exemplary embodiment, the biases of positive and negative polarities can both be subjected to highly accurate feedback control with a simple circuit configuration.

Next, referring to FIGS. 4 and 5, a high voltage power source according to a second exemplary embodiment will be described. In a configuration of the present exemplary embodiment described in detail below, an example where a bias is applied to the transfer roller 113 will be described. An application target of the present exemplary embodiment is only an example. An application target of the bias from the high voltage power source is not limited to the transfer roller, but can be a load that requires both biases of positive polarity and negative polarity. The configuration of the image forming apparatus is similar to that of the first exemplary embodiment, and thus description thereof will be omitted.

As a bias applied to the transfer roller 113 (hereinafter, also referred to as transfer bias), a bias of positive polarity and a bias of negative polarity are necessary. The transfer bias must be controlled to appropriately transfer an image to a sheet according to a material of the transfer roller 113 or the photosensitive drum 1, or a conveying speed of the sheet during the transfer.

In the present exemplary embodiment, a case where the transfer bias is subjected to constant voltage control will be described. In the present exemplary embodiment, description will be made based on a circuit configuration illustrated in FIG. 4. The present invention can even be applied to a configuration including a current detection circuit as a current detection unit illustrated in FIG. 11.

Figure 4:
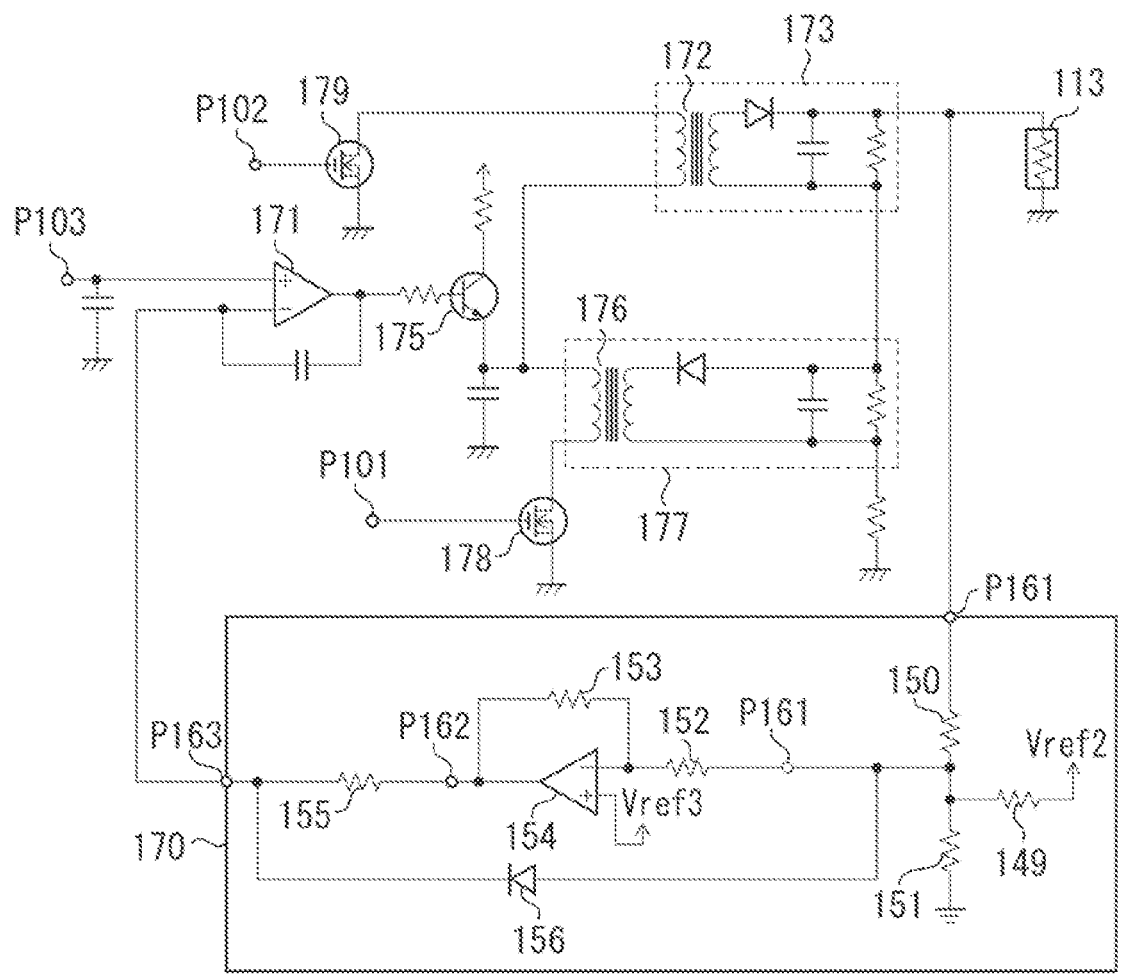
FIG. 4 is a diagram illustrating a voltage generation circuit of a power source according to a second exemplary embodiment.
Figure 5:
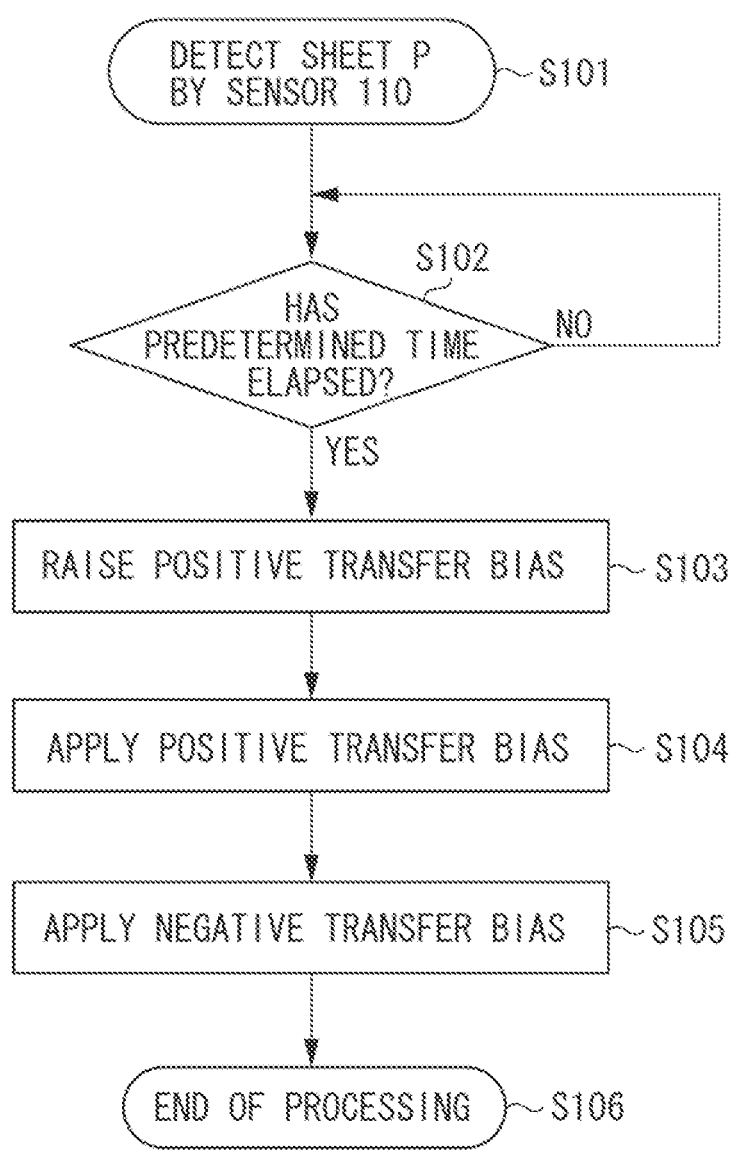
FIG. 5 is a flowchart illustrating a voltage application sequence of the voltage generation circuit according to the second exemplary embodiment.
Figure 6:
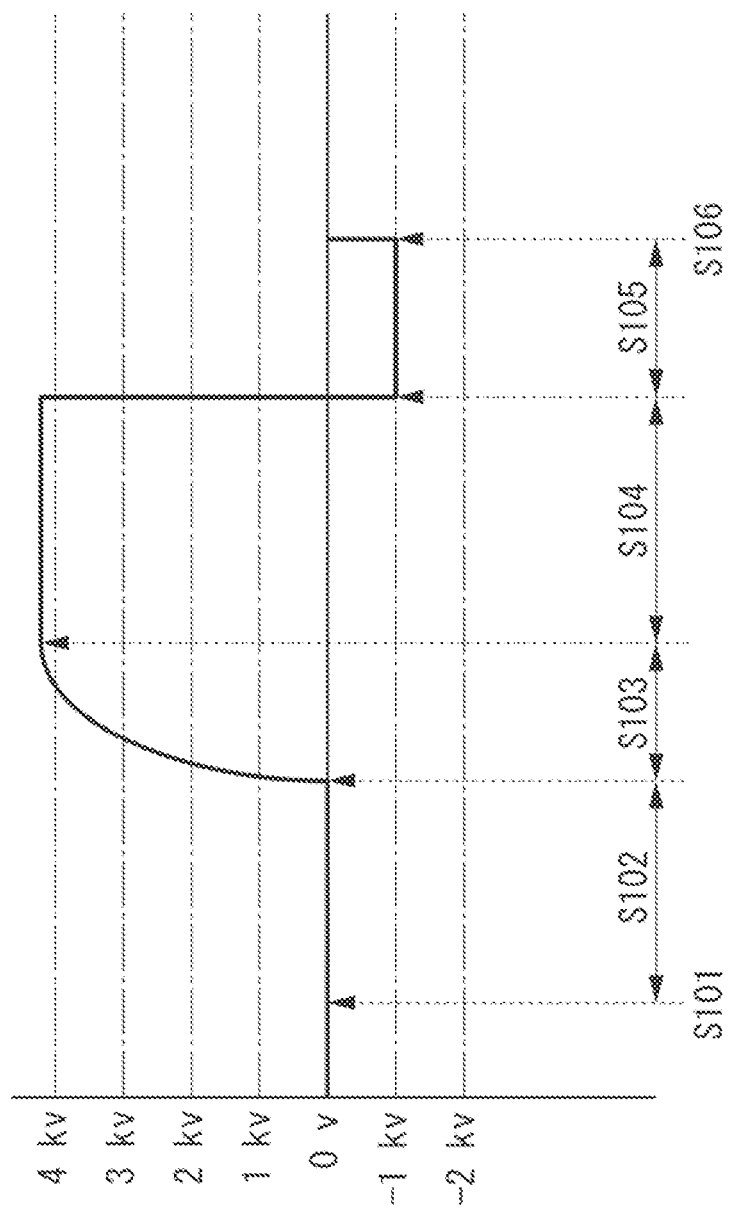
FIG. 6 is a chart illustrating voltage application timing of the voltage generation circuit according to the second exemplary embodiment.

FIG. 4 illustrates a voltage generation circuit of a high voltage power source 3 serving as a bias application unit according to the present exemplary embodiment. FIG. 5 is a flowchart illustrating a sequence of transfer bias application, and FIG. 6 is a chart illustrating a bias level (voltage value) at each timing of transfer bias application illustrated in FIG. 5.

Hereinafter, a bias of positive polarity applied to the transfer roller 113 will be referred to as a "transfer positive bias", and a bias of negative polarity applied to the transfer roller 113 will be referred to as a "transfer negative bias". While a sheet P passes through the transfer nip portion constituted by the photosensitive drum 1 and the transfer roller 113, the transfer positive bias is applied to the transfer roller 113. Accordingly, a developer image is applied to the sheet P. Since an environmental (temperature and humidity) change of the transfer roller 113 causes a change in its impedance (resistance value), a wide output range is required for the transfer positive bias. In other words, the transfer positive bias must be subjected to variable control according to the environmental change. In the present exemplary embodiment, an example using toner as a developer charged to negative polarity will be described. However, toner charged to positive polarity can be used.

First, referring to FIGS. 5 and 6, the timing of applying the bias to the transfer roller 113 in the image forming operation described above (in first exemplary embodiment) will be described in detail. Each of steps S101 to S106 illustrated in FIG. 6 respectively corresponds to each timing of steps S101 to S106 illustrated in FIG. 5. The sequence illustrated in FIGS. 5 and 6 is executed and controlled by the printer control unit 4 illustrated in FIG. 3 according to a program stored in a read-only memory (ROM) (not illustrated).

A procedure of applying the bias to the transfer roller 113 is started when the sheet P is detected by the sensor 110. In step S101, passage of a leading end of the sheet P is detected by the sensor 110. In step S102, the CPU 5 of the printer control unit 4 determines whether waiting time for application of a transfer bias according to a conveying speed of the sheet P has elapsed. In step S103, after the waiting time has elapsed, a transfer positive bias is applied to the transfer roller 113, and the transfer positive bias is raised to a fixed target output during a period from when the sheet P passes the sensor 110 to when it reaches the transfer nip portion. Then, in step S104, the transfer positive bias raised to the fixed output is output during a period when the sheet P is at the transfer nip portion. As described above, a voltage is applied in such a direction that a developer image on the photosensitive drum 1 is attracted to the transfer roller 113 side by applying the transfer positive bias, whereby the developer image is transferred to the sheet P at the transfer nip portion. Then, in step S105, a transfer negative bias is applied to the transfer roller 113 during a period from when the sheet P passes through the transfer nip portion to when a next sheet P comes to the transfer nip portion. Here, the transfer negative bias is applied so as to pull back toner slightly stuck to the transfer roller 113 to the photosensitive drum 1. This is effective to avoid staining the rear surface of the sheet P as toner may stick to a rear surface of the next sheet when no transfer negative bias is applied. The transfer negative bias is applied to prevent toner from sticking to the transfer roller 113, and thus referred to as a cleaning bias for removing toner on the transfer roller 113.

In the present exemplary embodiment, the biases applied to the transfer roller 113 are a transfer positive bias of about 4 kV and a transfer negative bias of about −1 kV. These bias values are appropriately adjusted according to environmental (temperature and humidity) fluctuation.

Figure 7:
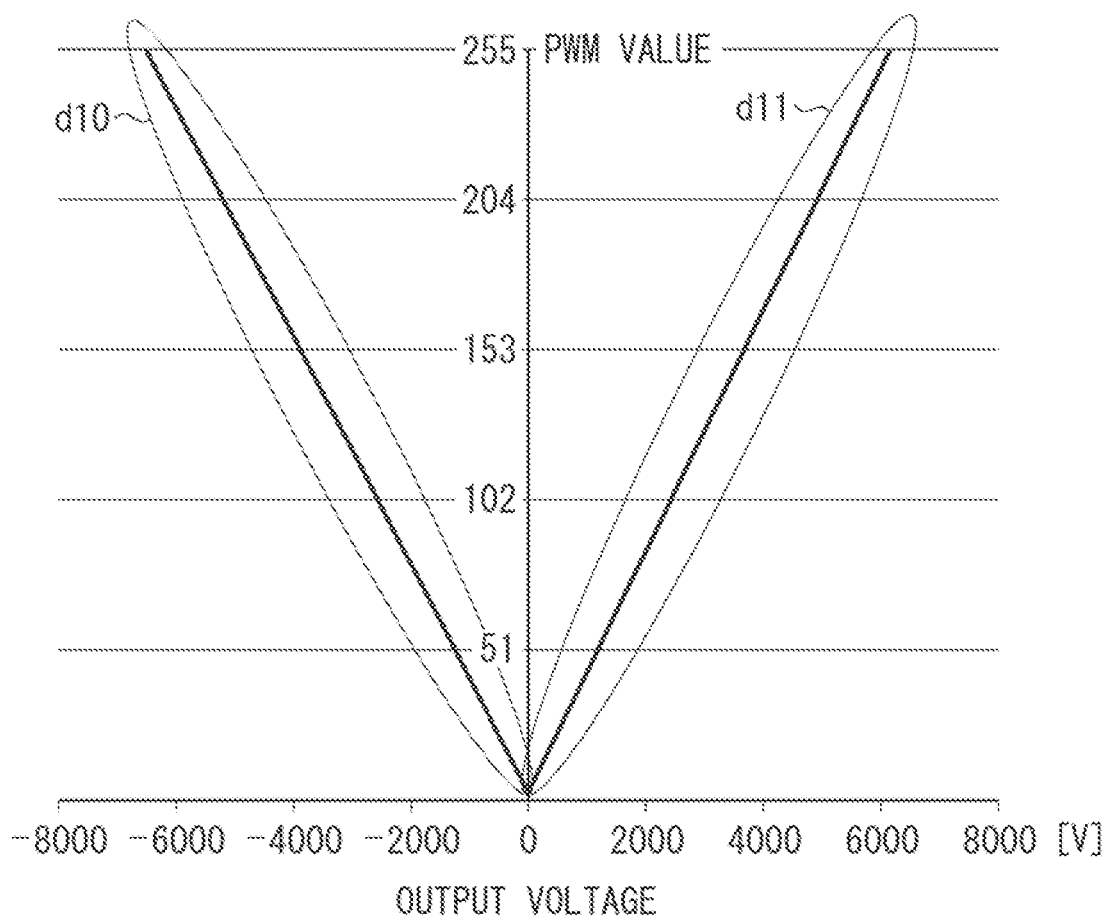
FIG. 7 is a graph illustrating a relationship between a pulse width modulation (PWM) signal from a central processing unit (CPU) and an output voltage according to the second exemplary embodiment.

Next, referring to FIG. 4, an output operation of a transfer bias will be described. In the present exemplary embodiment, a positive power source 173 for outputting a transfer positive bias and a negative power source 177 for outputting a transfer negative bias are connected in series. Points P101, P102, and P103 illustrated in FIG. 4 are connected to the CPU 5 of the printer control unit 4. FIG. 7 is a graph illustrating output characteristics of a transfer bias where a horizontal axis indicates an output voltage and a vertical axis indicates a PWM value. In the output characteristics, a range d11 is used when a transfer positive bias is output, and a range d10 is used when a transfer negative bias is output. In the present exemplary embodiment, as in the case of the first exemplary embodiment, a threshold value is 0 V. However, the threshold value can be set to an arbitrary value by changing a reference voltage Vref3 of an error amplifier 154 illustrated in FIG. 4.

When the transfer positive bias is output, a clock signal is output from a port of the CPU 5 connected to the point P102 to switch a FET 179, thereby driving a transformer 172. At this time, a transfer positive bias, i.e., a voltage of positive polarity, is output to the transfer roller 113 that is a load. A PWM value is set according to a setting signal from the port of the CPU 5 connected to the point P103, and an output level is adjusted based on the PWM value. An output increases as the PWM value increases. An output value of a feedback signal from a feedback unit 170 increases as an absolute value of a difference between the output and the threshold value 0 V increases. Conversely, the output value of the feedback signal from the feedback unit 170 decreases as the PWM value decreases.

When the transfer negative bias is output, a clock signal is output from the port of the CPU 5 connected to the point P101 to switch a FET 178, thereby driving a transformer 176. At this time, a voltage of negative polarity is output to the transfer roller 113 that is a load. A PWM value is set according to a setting signal from the port of the CPU 5 connected to the point P103, and an output level is adjusted based on the set PWM value. An output decreases as the PWM value increases. When the PWM value increases (output decreases), since an absolute value of a difference between the output and the threshold value 0 V increases, an output value of a feedback signal from the feedback unit 170 increases. Conversely, when the PWM value decreases, since the output increases (approaching 0 V), the output value of the feedback signal from the feedback unit 170 decreases.

In other words, in both cases of outputting the transfer positive bias and the transfer negative bias, the output value of the feedback signal from the feedback unit 170 increases when the absolute value of the difference between the output to the transfer roller 113 being a load and the threshold value 0 V increases. Then, the PWM signal input from the point P103 (input from CPU 5) is compared with the feedback signal from the feedback unit 170 by an error amplifier 171, and a transistor 175 is driven to control the output voltage to be constant. The operation of the circuit is similar to that of the first exemplary embodiment, and a basic operation principle is as described in the first exemplary embodiment. Thus, description thereof will be omitted.

In order to perform feedback control in both of the case where the output of the bias is negative polarity and the case where it is positive polarity, resistance values of resistors 149, 150, 151, 152, 153, and 155 are selected to satisfy the following conditions (5) and (6). When a positive bias is output:

$$V(P161) - Vf(D156) > V(P162) \quad (5)$$

When a negative bias is output:

$$V(P161) < V(P162) \quad (6)$$

V (P161): voltage of a point P161
V (P162): voltage of a point P162
Vf (D156): forward direction voltage of a diode 156

After selection of each constant (resistance) as described above, an output voltage V (P163) that is an output value of the feedback signal from the feedback unit 170 can be calculated by the following expressions (7) and (8).
In the case of a positive bias output:

$$V(P163) = \frac{V(P161) \cdot \{R151 // R155 // (R152 + R153)\} \cdot R149 + Vref2 \cdot \{R151 // R155 // (R152 + R153)\} \cdot R150}{R149 \cdot R150 + R149 \cdot \{R151 // R155 // (R152 + R153)\} + R150 \cdot \{R151 // R155 // (R152 + R153)\}} \quad (7)$$

In the case of a negative bias output:

$$V(P163) = Vref3 + (Vref3 - \alpha) \cdot \frac{R153}{R152} \quad (8)$$

$$\alpha = \frac{Vref2 \cdot R150 \cdot R151 \cdot R152 + Vref3 \cdot R150 \cdot R149 \cdot R151 + V(P161) \cdot R149 \cdot R151 \cdot R152}{R149 \cdot R150 \cdot R151 + R150 \cdot R151 \cdot R152 + R151 \cdot R152 \cdot R149 + R152 \cdot R149 \cdot R150}$$

V (P161): voltage of the point P161
V (P163): voltage of a point P163
//: parallel resistance Next, an example of changing output characteristics by adjusting each resistance value according to a range of each of positive and negative outputs or required resolution will be described.

Figure 8:
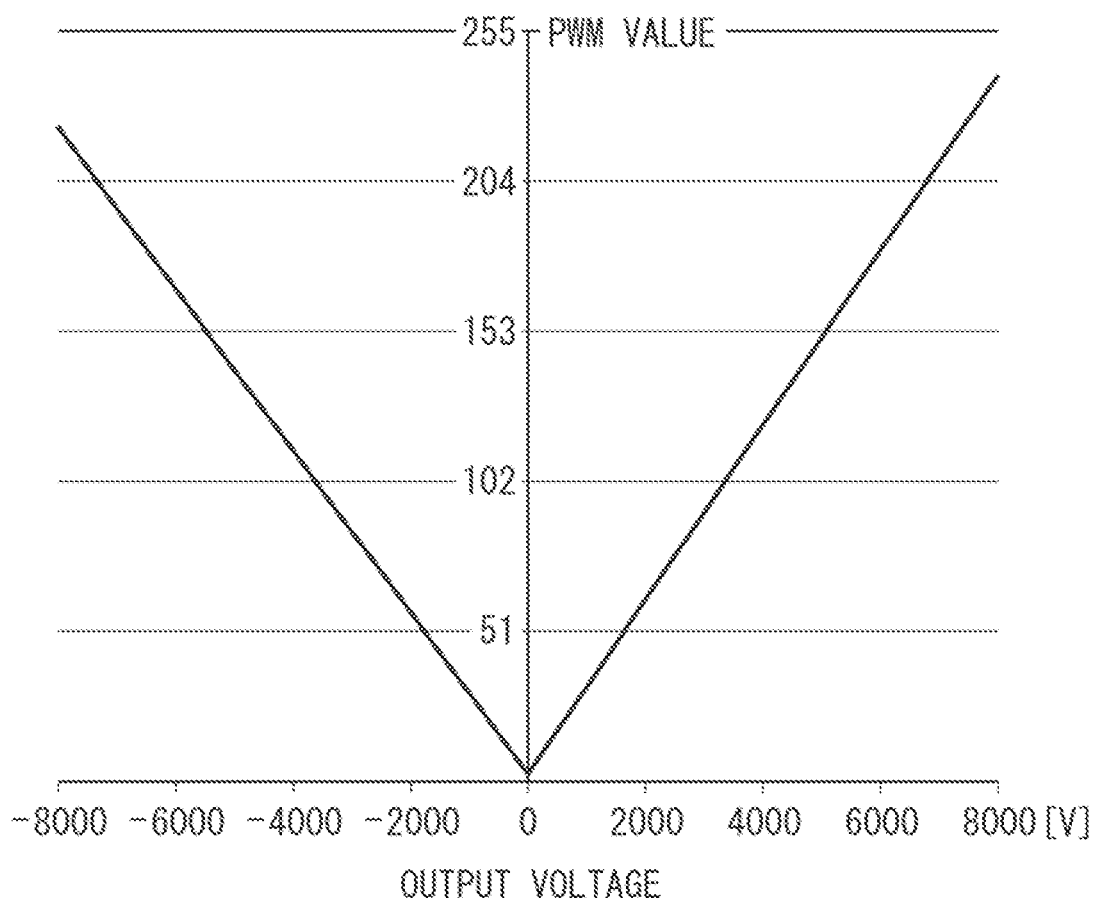
FIG. 8 is a graph illustrating a relationship between a PWM signal from the CPU and an output voltage according to the second exemplary embodiment.
Figure 9:
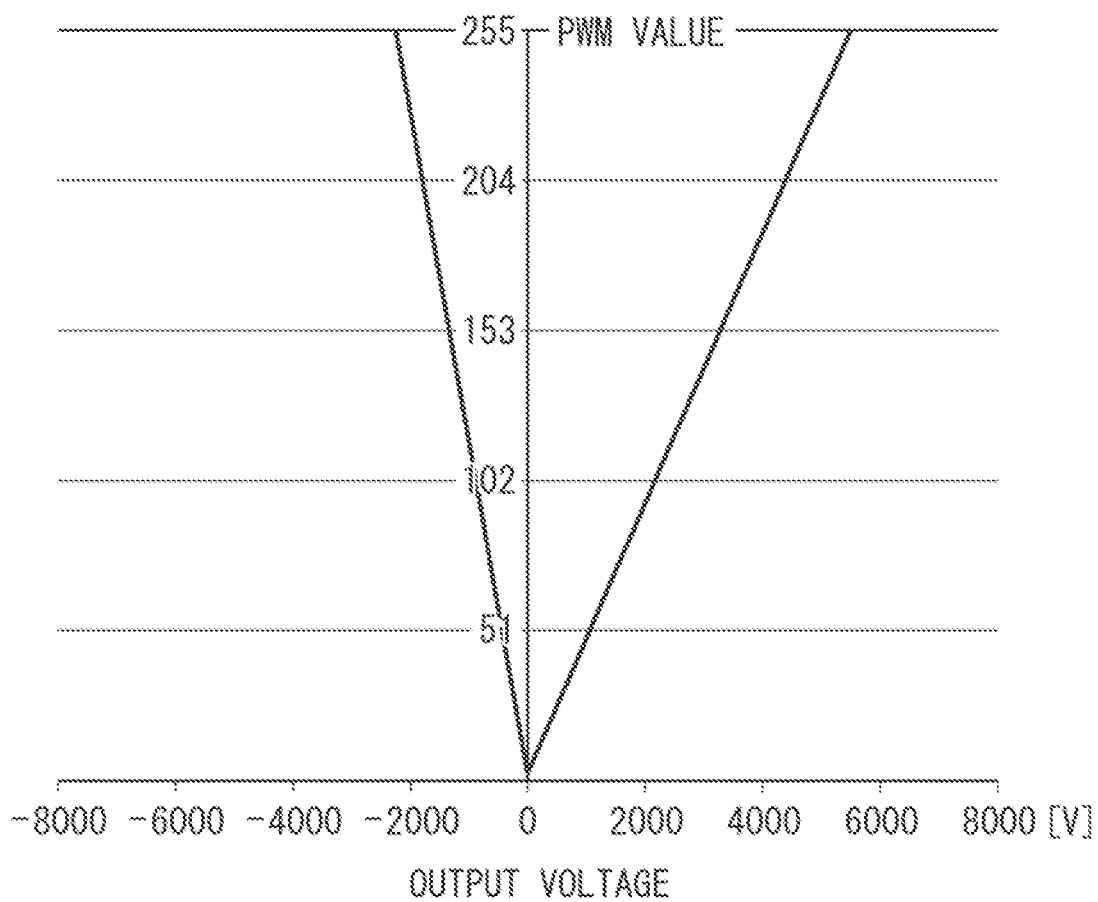
FIG. 9 is a graph illustrating a relationship between a PWM signal from the CPU and an output voltage according to the second exemplary embodiment.

With the output characteristics illustrated in FIG. 7 set as basic output characteristics, FIG. 8 illustrates an example of a range (output range) where the positive and negative outputs can be subjected to feedback control being widened by adjusting respective resistance values of the resistors 150 and 151. The output range has been widened to about −8 kV to about 8 kV in FIG. 8 while the output range is about −6 kV to about 6 kV in FIG. 7. FIG. 9 illustrates resolution increased by adjusting resistance values of the resistors 152 and 153 to narrow a feedback controllable range of the negative polarity bias side. In FIG. 9, a range of the negative polarity bias is −2 kV to 0 V. PWM values illustrated in FIGS. 7, 8, and 9 can be set to values of 0 to 255. The PWM values illustrated in FIGS. 7 to 9 are values at intervals similar to those illustrated in FIG. 2.

Thus, by adjusting the resistance values, the output characteristics can be adjusted for both positive and negative polarities, or only either of the positive or negative polarity. Selection of resistance or a reference voltage (Vref2 or Vref3) to be adjusted can be changed depending on a load condition. The aforementioned example is for adjusting the output characteristics to those illustrated in FIGS. 8 and 9.

Figure 10:
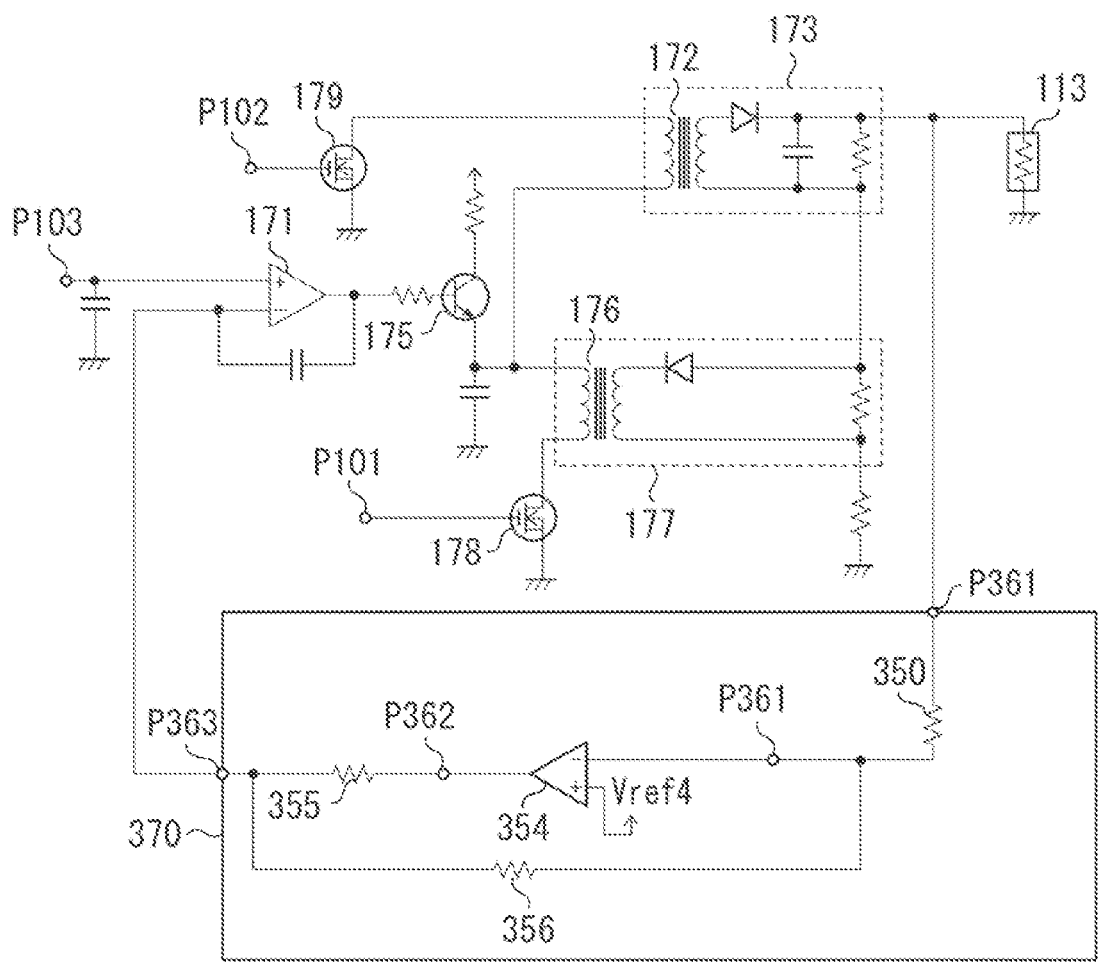
FIG. 10 is a diagram illustrating a voltage generation circuit of the power source according to the second exemplary embodiment.

FIG. 10 illustrates a modified example of the present exemplary embodiment. This circuit is advantageous in that a circuit size can be reduced while having less flexibility to change output characteristics or resolution. Specifically, as compared with the circuit illustrated in FIG. 4, the number of circuit elements included in a feedback unit 370 is reduced.

Assuming a reference voltage Vref4=0 V to simplify description, output voltages from the feedback unit 370 can be calculated by the following expressions (9) and (10).
In the case of a positive output:

$$V(P363) = V(P361) * R355/(R355 + R356 + R350) \quad (9)$$

In the case of a negative output:

$$V(P363) = V(P361) * R356/R350 \quad (10)$$

V (P361): voltage of a point P361
V (P363): voltage of a point P363

Thus, according to the present exemplary embodiment, the biases of positive and negative polarities can both be subjected to highly accurate feedback control with a simple circuit configuration. Furthermore, both positive and negative output characteristics can be easily changed.

Figure 11:
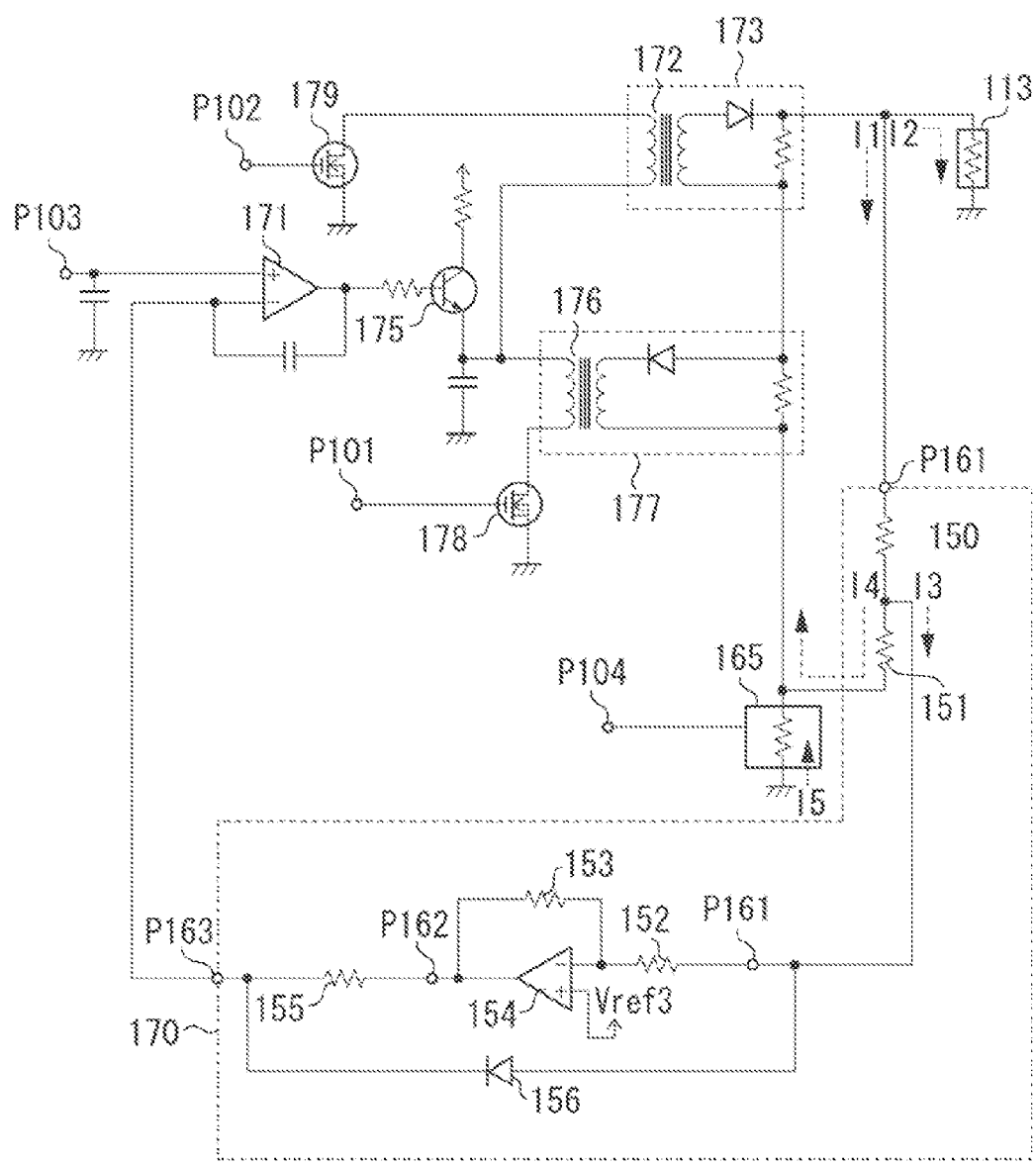
FIG. 11 is a diagram illustrating a voltage generation circuit of a power source according to a third exemplary embodiment.

Referring to FIG. 11, a high voltage power source according to a third exemplary embodiment will be described. The present exemplary embodiment is directed to a case where a transfer bias is subjected to constant current control. In FIG. 11, a current detection unit 165 is added to the circuit configuration illustrated in FIG. 4. An application target of a bias in the present exemplary embodiment is only an example. The application target of the bias from the high voltage power source is not limited to a transfer roller, but can be a load that requires both biases of positive polarity and negative polarity. Description of components similar to those of the second exemplary embodiment will be omitted. The configuration of the image forming apparatus is similar to that of the first exemplary embodiment, and thus description thereof will be omitted.

After a transfer bias has been applied, current is divided into current I2 flowing to a load (transfer roller) 113 and current I1 flowing to the feedback unit 170. The current I2 flowing to the load 113 returns to the positive power source 173 for a transfer positive bias and the negative power source 177 for a transfer negative bias via the current detection unit 165. The current I1 flowing to the feedback unit 170 is divided into two (current I4 and I3) at a branch point between the resistors 150 and 151. The current I4 flowing to the resistor 151 returns to the positive power source 173 and the negative power source 177 not via the current detection unit 165. On the other hand, the current I3 returns to the positive power source 173 and the negative power source 177 via the error amplifier 154 and the current detection unit 165.

Next, referring to FIG. 13, a procedure when control is performed to supply constant current by applying a transfer positive bias during printing will be described. Each timing of steps S103-1 to S103-6 illustrated in FIG. 13 respectively corresponds to each of steps S103-1 to S103-6 illustrated in FIG. 12.

A procedure of applying the bias to the transfer roller 113 is started when a sheet P is detected by the sensor 110. In step S103-1, passage of a leading end of the sheet P is detected by the sensor 110. In step S103-2, the CPU 5 of the printer control unit 4 determines whether waiting time for application of a transfer bias according to a conveying speed of the sheet P has elapsed. In step S103-3, after the waiting time has elapsed, a transfer positive bias is applied, and an output value of the transfer positive bias is fine-adjusted during a period from when the sheet P passes the sensor 110 to when it reaches the transfer nip portion. Then, in step S103-4, the fine-adjusted transfer positive bias is output during a period when the sheet P is at the transfer nip portion. The fine adjustment of the transfer positive bias is necessary when constant current control is performed. The fine adjustment is performed by the procedure illustrated in FIG. 13.

In step S103-1, the a first output voltage level signal of the transfer positive bias is input from the CPU 5 of the printer control unit 4 via the point P103, and compared with an output of a feedback signal from the feedback unit 170 by the error amplifier 171. The error amplifier 171 changes its output according to a comparison result, and performs control to set an output voltage to the load 113 constant by driving the transistor 175. In step S103-2, the CPU 5 calculates the current I2 obtained by subtracting the current I3 flowing to the error amplifier 154 from current I5 detected by the current detection unit 165. This current I2 is a load current value. At this time, a value of current flowing to the error amplifier 154 can be calculated by converting the first output voltage level signal into an output voltage. In step S103-3, a load resistance value is calculated from the output voltage and the load current value. Then, in step S103-4, a target value of an output voltage is calculated from the load resistance value and a target value of output current determined according to an environment (temperature or humidity), and converted into an output voltage level signal. In step S103-5, a transfer positive bias is output according to the output voltage level signal. In the described sequence, application of the transfer positive bias is performed under constant current control. The control of the transfer positive bias has been described. For a transfer negative bias, current division and an execution flow of constant current control illustrated in FIG. 13 are similar to those for the transfer positive bias, and thus description thereof will be omitted.

In the configuration where no feedback unit 170 of the present exemplary embodiment is included but only the current detection unit 165 is included, after the output at the first output voltage level, the CPU 5 outputs a higher level signal than the first output voltage level when the detected current is lower than a target value while the CPU 5 outputs a lower level signal than the set output voltage level when the detected current is higher than the target value. Under such control where changing of the output voltage level signal from the CPU 5 is repeated to acquire target output current, time for fine adjustment is longer than that of the method of the present exemplary embodiment.

Thus, according to the present exemplary embodiment, the biases of positive and negative polarities can both be subjected to highly accurate feedback control with a simple circuit configuration.

According to the present exemplary embodiment, the feedback unit 170 has a voltage feedback function, and the current detection unit 165 has a current transmission function to the CPU 5. Thus, time for output fine adjustment in the sequence can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-017119 filed Jan. 31, 2013, which is hereby incorporated by reference herein in its entirety.

What is claimed is:

1. A power source apparatus for outputting a voltage of positive polarity and a voltage of negative polarity, the power source apparatus comprising:
    a transformer;
    a switching unit connected to a primary side of the transformer, configured to drive the transformer;
    a capacitive element connected to a secondary side of the transformer;
    a first constant voltage element connected to the transformer side with respect to the capacity element;
    a second constant voltage element connected to an output side of a voltage with respect to the capacity element;
    a feedback unit configured to output a feedback signal based on an output voltage output from a secondary side of the transformer to a load and a threshold value; and
    a control unit configured to control, so as to control a voltage of the capacitive element, a drive signal for driving the switching unit based on the feedback signal,
    wherein, based on the feedback signal, in a case where a voltage output to the load is a voltage of negative polarity, the control unit controls the drive signal so as to prevent a current from flowing into the first constant voltage element and the second constant voltage element, and in a case where a voltage output to the load is a voltage of positive polarity, the control unit controls the drive signal so that a current flows into the second constant voltage element.

2. The power source apparatus according to claim 1, wherein the feedback unit controls the feedback signal based on an absolute value of the difference between the voltage output and the threshold value.

3. The power source apparatus according to claim 1,
    wherein the feedback unit includes an error amplification unit configured to acquire an absolute value of the difference by comparing the voltage output with the threshold value, and
    wherein a value of the feedback signal output from the feedback unit increases as the absolute value of the difference increases, and the value of the feedback signal decreases as the absolute value of the difference decreases.

4. The power source apparatus according to claim 1, wherein the voltage of positive polarity and the voltage of negative polarity are output to the same load.

5. The power source apparatus according to claim 1, further comprising a current detection unit configured to detect current flowing through a load to which the voltage of positive polarity and the voltage of negative polarity are output,
    wherein the voltage of positive polarity or the voltage of negative polarity is adjusted so that current flowing through the current detection unit becomes constant.

6. The power source apparatus according to claim 1,
wherein, in a case where the voltage of positive polarity is output, a current is prevented from flowing into the second constant voltage element.

7. An image forming apparatus for forming an image on a recording medium, the image forming apparatus comprising:
an image forming unit configured to form an image; and
a power source configured to output a voltage of positive polarity and a voltage of negative polarity to the image forming unit,
wherein the power source includes:
a transformer;
a switching unit connected to a primary side of the transformer, configured to drive the transformer;
a capacitive element connected to a secondary side of the transformer;
a first constant voltage element connected to the transformer side with respect to the capacity element;
a second constant voltage element connected to an output side of a voltage with respect to the capacity element;
a feedback unit configured to output a feedback signal based on an output voltage output from a secondary side of the transformer to a load and a threshold value; and
a control unit configured to control, so as to control a voltage of the capacitive element, a drive signal for driving the switching unit based on the feedback signal,
wherein, based on the feedback signal, in a case where a voltage output to the load is a voltage of negative polarity, the control unit controls the drive signal so as to prevent a current from flowing into the first constant voltage element and the second constant voltage element, and in a case where a voltage output to the load is a voltage of positive polarity, the control unit controls the drive signal so that a current flows into the second constant voltage element.

8. The image forming apparatus according to claim 7, wherein the feedback unit controls the feedback signal based on an absolute value of the difference between the voltage output and the threshold value.

9. The image forming apparatus according to claim 7,
wherein the feedback unit includes an error amplification unit configured to acquire an absolute value of the difference by comparing the voltage output with the threshold value, and
wherein a value of the feedback signal output from the feedback unit increases as the absolute value of the difference increases, and the value of the feedback signal decreases as the absolute value of the difference decreases.

10. The image forming apparatus according to claim 7, wherein the voltage of positive polarity and the voltage of negative polarity are output to the same load.

11. The image forming apparatus according to claim 7, further comprising a current detection unit configured to detect current flowing through a load to which the voltage of positive polarity and the voltage of negative polarity are output,
wherein the voltage of positive polarity or the voltage of negative polarity is adjusted so that current flowing through the current detection unit becomes constant.

12. The image forming apparatus according to claim 7, wherein the image forming unit includes a fixing unit configured to fix the image on the recording medium.

13. The image forming apparatus according to claim 7, wherein the image forming unit includes a transfer unit configured to transfer the image to the recording medium.

14. The image forming apparatus according to claim 7,
wherein, in a case where the voltage of positive polarity is output, a current is prevented from flowing into the second constant voltage element.

* * * * *